Patented June 11, 1946

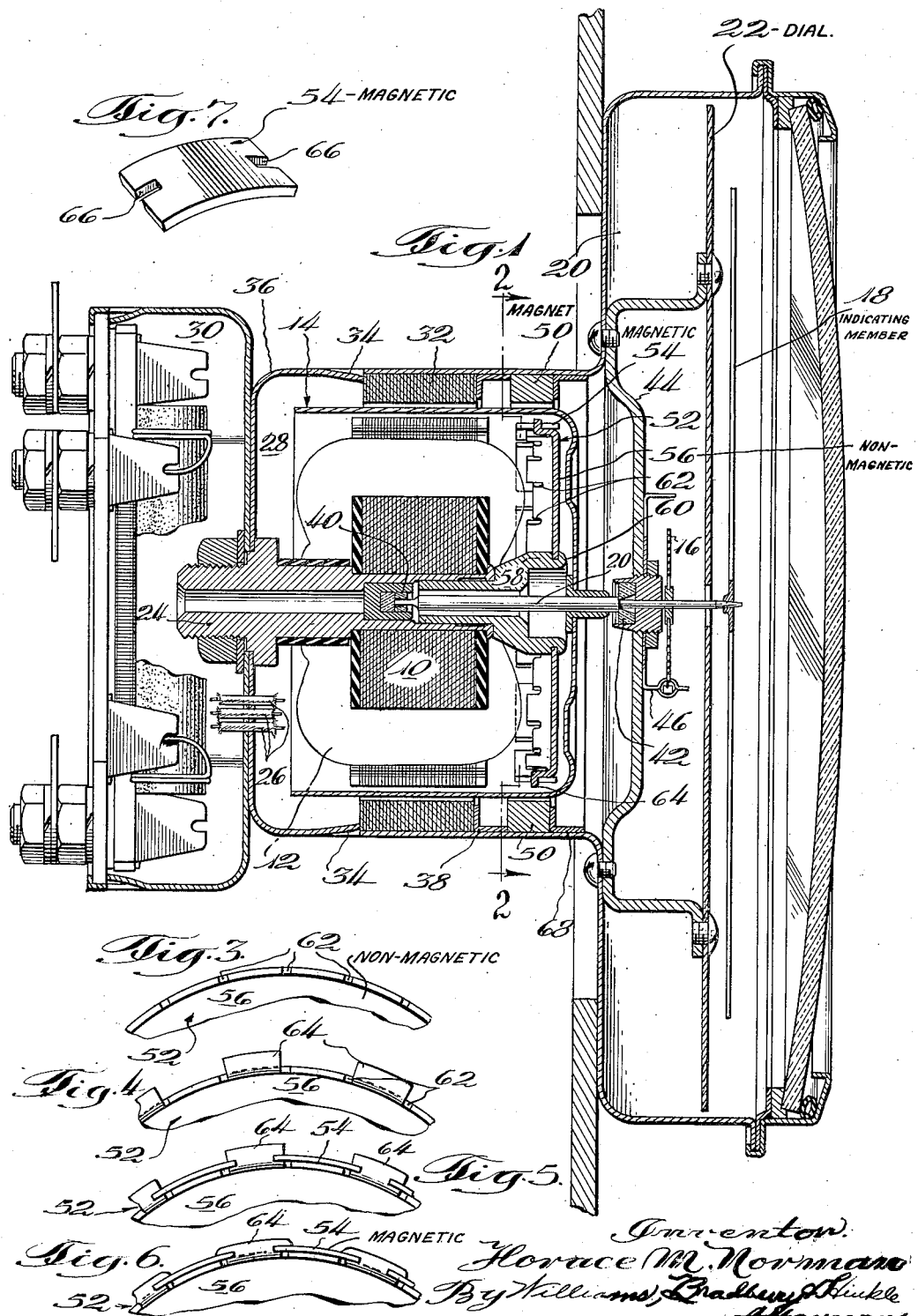

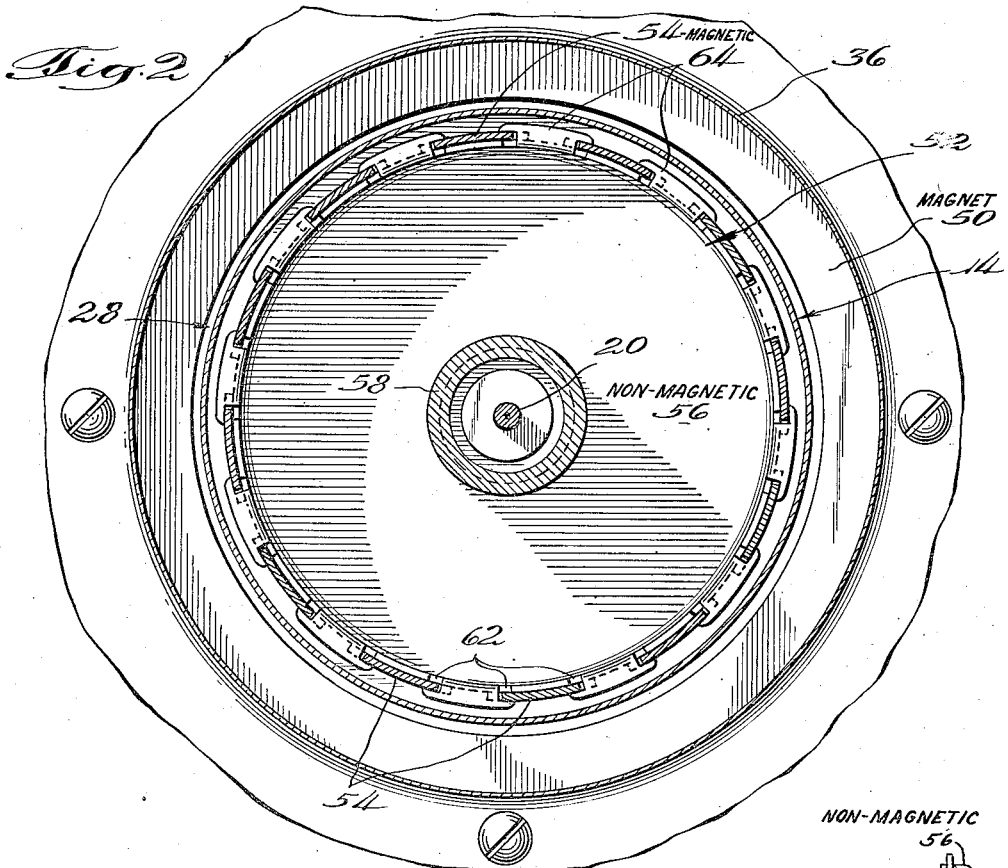
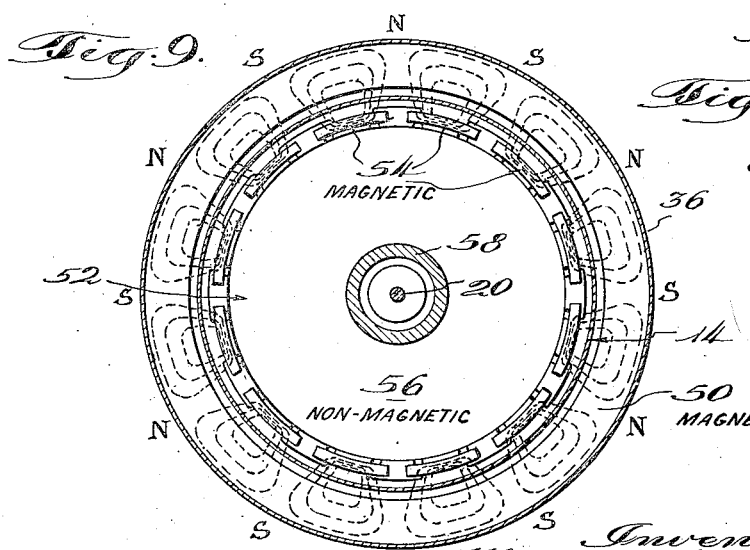
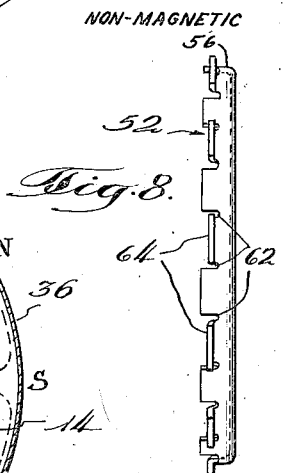

2,401,839

UNITED STATES PATENT OFFICE 2,401,839

ELECTRICAL INDICATOR

Horace M. Norman, Skokie, Ill., assignor to Stewart-Warner Corporation, Chicago, Ill., a corporation of Virginia Application July 28, 1943, Serial No. 496,378

8 Claims. (Cl. 171—95)

This invention relates to electrical indicators, and particularly to the indicating unit of an electrical speedometer for indicating either translatory speeds of devices, such as automobiles, or rotational speeds of devices, such as engines, shafts or the like.

The primary object of the invention is to provide a new and improved arrangement for magnetically damping the movement of an indicator needle to prevent undesirable movement thereof by sudden changes in speed, vibrations or movements of the vehicle or other structure on which it may be mounted.

Another object of the present invention is to provide a new and improved speed indicating unit having magnetic damping means constructed and arranged effectively to damp the movement of the pointer and with minimum interference with the operation of the unit.

A further object of the present invention is to provide a new and improved speed indicating unit of the type wherein a pointer is actuated by an induction type rotor having highly effective magnetic rotor damping means located in proximity to the rotor and to the field producing winding associated therewith and which does not materially increase the leakage flux and thus the reactance of the apparatus.

Other objects and advantages of the invention will become apparent from the following description of one embodiment of the invention.

In the drawings:

Fig. 1 is a cross-sectional view of a speed indicating unit embodying the present invention. The stator windings have been shown in phantom only;

Fig. 2 is an enlarged cross-sectional view taken on the line 2—2 of Fig. 1;

Figs. 3 to 6, inclusive, are fragmentary plan views illustrating the manner in which a field plate assembly forming a portion of the damping means is constructed;

Fig. 7 is a perspective view of one of a number of field plate forming members utilized in the construction of the field plate assembly;

Fig. 8 is a side view of a portion of the field plate assembly in an intermediate state of construction corresponding to that shown in Fig. 4;

Fig. 9 is a diagrammatic representation of a portion of the structure, notably the flux producing means and the field plate assembly of the damping means, having shown thereon magnetic lines of force better to illustrate the action of the damping means.

The drawings illustrate an electric speedometer indicating unit, comprising a stator having polyphase windings supplied with alternating current and adapted to set up a revolving magnetic field and to move a pointer actuating rotor against a resilient mechanical resistance (hair spring), thereby to control the position of the pointer in response to the speed to be indicated.

The sending unit of the electric speedometer, which is not shown, may be of the type disclosed in my copending applications Serial Nos. 243,977, filed December 5, 1938 (which issued as Patent No. 2,339,743 on January 18, 1944), and 484,589, filed April 26, 1943. This sending unit is a polyphase alternating current generator comprising a permanent magnet rotor rotated by suitable means at a speed bearing a predetermined relationship with the speed of the device whose speed is to be indicated, which may be the translatory speed of an automobile or the speeds of rotation of engines of various types or of shafts and the like.

The damping means of the present invention may be utilized with indicating units of various types, and it has been illustrated as being applied to an indicating unit of the type disclosed in the first of the two heretofore referred to copending applications and in my copending application Serial No. 484,590, filed April 26, 1943.

Referring now to the drawings, and particularly to Figs. 1 and 2, it may be noted that the indicating unit is provided with a stator 10 having an armature winding 12 adapted to be supplied with alternating current from the sending unit (not shown). The winding 12, which is preferably a three-phase winding, produces a revolving magnetic field and rotates a nonmagnetic induction rotor 14 against the resisting force of a spiral hair spring 16. An indicating needle 18 is secured to the outer end of a rotor supporting shaft 20 and moves with the rotor to different positions, depending upon the alternating current supplied to the armature winding by the sending unit, and thus indicates the speed of the device with which the sending unit is associated. The indicator needle may have associated with it a suitable indicating dial 22.

The stator 10 is supported on a fixed hollow shaft 24. The armature is preferably made of laminations having a central supporting portion and a plurality of substantially T-shaped radially extending teeth (not shown). It is preferred that there be six of these teeth, and that the armature windings, of which there are three in a three-phase armature, each comprise a pair of series connected coils. The coils in one phase winding lie in slots 1, 3 and 4, 6, assuming that the slots are numbered consecutively from 1 to 6. The coils for the second phase winding lie in slots 2, 4 and 5, 1, and the coils for the third phase winding lie in slots 3, 5 and 6, 2. The windings are so disposed that, when supplied with a three-phase alternating current from the sending unit, a two-pole revolving magnetic field is produced in a manner well known in the art. The phase windings may be connected to the sending unit through the three conductors 26 extending from the windings to the sending unit through the armature compartment 28 and a resistor compartment 30. Inasmuch as the physical structure of the indicator unit and of the resistor compartment forms no part of the present invention, it is not deemed necessary to describe these in further detail.

A return path for the magnetic flux set up by the armature winding is provided by annular laminations 32 concentrically arranged with respect to the armature laminations and surrounding a part of the axial portion of the rotor 14, which it may be noted is generally cup-shaped. The laminations are held in fixed position by spaced apart indented portions 34 of a housing 36 and by an annular retaining member 38 having a generally L-shaped cross-section.

The rotor 14 and the indicating needle 18 are both mounted on and rotate with the shaft 20 which is journaled for rotation in opposed bearings 40 and 42 mounted respectively in the fixed hollow shaft 24 and a diametrically extending cross support 44. One end of the spiral hair spring 16 is secured to the shaft 20 and the other to an adjustable spring adjuster 46 supported by support 44.

The damping means of the present invention is constructed and arranged to provide a highly effective damping of the rotor without materially increasing the leakage flux, and thus the reactance, which would decrease the current flow through the armature winding and produce a decrease in the indicator deflection. The damping means comprises a flux producing means, preferably a multi-pole permanent magnet in proximity to the rotor, and a magnetic field plate, preferably comprising a number of spaced apart magnetic portions, also in proximity to the rotor but located at the opposite side of the rotor from that at which the permanent magnet is located. The permanent magnet produces the magnetic flux required in damping the movement of the rotor, and the field plate increases the effectiveness of the damping action while the use of a field plate comprising a plurality of spaced apart portions prevents any material increase in leakage flux and reactance.

The magnetic flux providing the damping is preferably provided by the permanent magnet 50 located in close proximity to the rotor 14. It is preferred, because of space requirements, that the magnet be located to the exterior of the rotor and in the space between the rotor and the housing 36. It is preferred also that the magnet be of the continuous type and have a plurality of pole defining portions. It has been found that a magnet having twelve poles gives good results. It is preferred also that the magnet be made of "Red Streak Alnico," and that the poles be concentrated on the inner surface of the ring where the greatest magnetic concentration is desired. When the rotor 14 is moved in response to changes in the alternating current supplied to the armature winding, or for other reasons, eddy currents are induced in the rotor by the flux provided by the permanent magnet, and movements of the rotor are thus damped.

In order to increase the damping effect a field plate, indicated generally by reference character 52, is disposed in proximity to the rotor and at the side of the rotor opposite the permanent magnet. Thus, in the instant embodiment, the field plate is disposed within the interior of the cup-shaped rotor. It is preferred, because of space requirements and in order to prevent the field plate structure from increasing the leakage flux and reactance, that the field plate take the form of a discontinuous annular ring made of magnetic material, such as soft steel. Thus, the structure includes a plurality of spaced apart arcuate field plate defining members 54 supported near the inner periphery of the rotor by a generally circular plate 56, of non-magnetic material such as brass, secured to the stator by an axially extending hollow support 58. The rotor shaft 20 extends through the hollow support 58 and the latter is preferably secured to the stator as by a press fit. The plate 56 may be secured to the support 58 in any suitable manner, as by peening a portion 60 thereof extending through a central aperture in the plate.

The construction of the field plate structure is best noted from Figs. 3 to 8, inclusive, to which reference is now had. The brass plate 52 is first formed to have a generally cup-like shape, as by a drawing process. The peripheral flange is then cut in any suitable manner to provide a series of spaced apart notches 62. The notches are preferably equally spaced apart so that the number of projections is equal to twice the number of field plate forming members 54, the number of which corresponds to the number of poles on the magnet 50. Alternate projections 64 are bent radially outward, as best illustrated in Figs. 4 and 8, to provide supports for the field plate forming members 54, which are best illustrated in Fig. 7, and consist of arcuate portions having slots 66 formed centrally at opposite ends thereof, whereby the members may be slid onto the bent over projections 64 of plate 56, as illustrated in Fig. 5. The depth of the notches is preferably such that when the projections are bent over, the radial length is approximately three times the thickness of the projection, so that the projections may thereafter be rolled over, as illustrated in Fig. 6, securely to hold the field plate members 54 in place.

The field plate assembly is mounted in the indicator unit in the course of the assembly of the unit and prior to the mounting of the rotor therein. The preferred procedure is to construct the field plate structure as described above, and then secure it to the hollow shaft 58 which in turn is secured to the stator 10. In placing the field plate structure on the stator, it is not important to get it into any particular location relative to the stator windings 12, but it is important to locate the field plate and magnet in such relationship to each other that the centers of the magnet poles on the magnet 50 are located substantially centrally of the gaps between the field plate members 54. An expeditious procedure for so locating the field plate and magnet is first to secure the field plate assembly in position and then insert the magnet ring into place so that it abuts against the retaining ring 38. The magnet ring is so dimensioned that it can be agitated (i. e., made to "dance") by tapping, as with a wooden mallet or the like, and thus automatically takes the desired position with the centers of the magnet poles opposite the gaps between the field plate members 54. When the positions have once been determined, the magnet is held in place by a retaining ring 68, which may be similar to the retaining ring 38. After the damping means have been properly located and secured in place, the remainder of the indicating unit may be readily assembled.

The damping action is provided by eddy currents induced in the nonmagnetic rotor 14 whenever the rotor moves. The eddy currents are induced by the movement of the rotor through the lines of flux passing from portions of north poles to adjacent south poles in the manner illustrated diagrammatically by the dotted lines in Fig. 9. From this figure it may be noted that the field plate members 54 are so located as to help the permanent magnet flux as much as possible.

The field plate is, as already indicated, preferably made of a number of spaced apart members so that the plate has no material tendency to increase the leakage flux of the armature winding which is relatively close to it. It may be remembered that the armature winding is constructed and arranged to produce a two-pole revolving field so that the leakage flux has to jump from one segment to the next, and so on. The discontinuous nature of the field plate thus minimizes any increase in leakage flux with its attendant increase in reactance and loss of deflection.

Should a different number of poles than twelve be used, then the number of field plate members 54 would be changed accordingly.

While it is preferred, for reasons hereinbefore set forth, that the field plate be constructed as described above, it should be understood that the present invention in its broader aspects comprehends other types of flux producing and field plate structures. For instance, the field plate could be made from a single piece of steel having the same general shape as the structure 52, i. e., be generally cup-shaped, especially if cognizance was taken of the increased reactance resulting from the use of such a field plate. The flux likewise could be produced by means other than the continuous ring permanent magnet.

While a preferred embodiment of the invention has been described in detail, many modifications may be made without departing from the spirit of the invention, and I do not wish to be limited to the details of construction set forth, but desire to avail myself of all changes within the scope of the appended claims.

Having thus described my invention, what I claim as new and desire to secure by Letters Patent of the United States is:

1. In an electrical indicating unit having an induction rotor, an indicating member movable thereby and means for moving said rotor, the combination including, means including a plurality of spaced apart magnetic poles of alternate polarity positioned in proximity to said rotor for producing magnetic flux to damp movements thereof, and flux conducting means made of magnetic material positioned in proximity to said rotor and on the side opposite the rotor from said flux producing means, said last mentioned means including a plurality of spaced apart members made of magnetic material and so located that the gaps between them are located substantially centrally with respect to the magnetic poles.

2. In an electrical indicating unit having a generally cup-shaped induction rotor, an indicating member movable thereby and a revolving field producing winding located substantially within said rotor for effecting movement of the rotor, the combination including, flux producing means surrounding an axial portion of the rotor near the closed end thereof and positioned in proximity to the rotor to damp movements thereof, and a field plate defining structure located in proximity to said rotor and on the inside of said rotor, said field plate defining structure including a flanged portion opposite the magnetic pole defining structure.

3. In an electrical indicating unit having an induction rotor, an indicating member movable thereby, and a revolving magnetic field producing means for moving said rotor, the combination including, means including structure defining a plurality of spaced apart magnetic poles of alternate polarity located in proximity to one side of the rotor, to damp movements of the rotor, and a field plate structure positioned on the opposite side of the rotor comprising a support made of nonmagnetic material, and a plurality of arcuate spaced apart members made of magnetic material and supported on said nonmagnetic support, the number of said members corresponding to the number of magnetic poles and said members being located so that the gaps therebetween are located substantially centrally of the magnetic poles.

4. In an electrical indicating unit having a cup-like induction rotor, an indicating member movable thereby, and a revolving magnetic field producing means for moving said rotor, the combination including, means including a continuous ring having a plurality of spaced apart magnetic poles of alternate polarity surrounding the rotor and located in proximity thereto to damp movements thereof, and a field plate structure positioned on the inside of the rotor comprising a cup-like support made of nonmagnetic material and having alternate axially and radially extending projections, and a plurality of arcuate spaced apart members made of magnetic material and each supported by adjacent radially extending portions of the support, the number of said members corresponding to the number of magnetic poles and said members being located so that the gaps therebetween are located substantially centrally of the magnetic poles.

5. A field plate, including in combination, a generally cup-shaped nonmagnetic supporting member having a plurality of axially extending projections on the axial portion thereof, alternate ones of said projections being bent radially outwardly, arcuate field plate defining members slotted at their ends and adapted to be slid over adjacent ends of the bent over projections whereby they are supported by the projections, and the outer ends of said radially extending projections being further bent over to secure said members in place.

6. A field plate, including in combination, a generally cup-shaped nonmagnetic supporting member and arcuate field plate defining members secured in spaced apart relation and to one side of the axially extending portion of said supporting member.

7. In an electrical indicating unit having an induction rotor, an indicating member movable thereby, and means providing a multi-pole revolving field for moving said rotor, the combination including, flux producing means positioned in proximity to said rotor to damp movements thereof, and means including a plurality of magnetic members positioned in proximity to said rotor and on the side opposite the rotor from the flux producing means providing substanitally continuous paths for the damping flux and a discontinuous path for leakage flux of the revolving field.

8. In an electrical indicating unit including an induction rotor having a cylindrical surface, an indicating member movable thereby, and means for moving said rotor, the combination including, a permanent magnet having a cylindrical surface adjacent the cylindrical surface of the rotor and a plurality of magnetic poles of alternating polarity along the surface providing flux to damp movements of the rotor, and a field plate structure including a plurality of angularly spaced apart magnetic flux conducting members associated with the magnetic poles to conduct damping flux and to decrease flow of leakage flux circumferentially of the structure between said members.

HORACE M. NORMAN.